(12) United States Patent
Krobok

(10) Patent No.: US 9,085,255 B2
(45) Date of Patent: Jul. 21, 2015

(54) VENTILATION MEANS

(75) Inventor: Martin Krobok, Aichach (DE)

(73) Assignee: Gentherm GMBH, Odelzhausen (DE)

( * ) Notice: Subject to any disclaimer, the term of this patent is extended or adjusted under 35 U.S.C. 154(b) by 1427 days.

(21) Appl. No.: 12/406,520

(22) Filed: Mar. 18, 2009

(65) Prior Publication Data

US 2009/0253362 A1    Oct. 8, 2009

(51) Int. Cl.
*B60H 1/00* (2006.01)
*B60N 2/56* (2006.01)
*B61D 33/00* (2006.01)
*A47C 7/74* (2006.01)

(52) U.S. Cl.
CPC .............. *B60N 2/5642* (2013.01); *B61D 33/00* (2013.01); *A47C 7/74* (2013.01); *B60H 1/00285* (2013.01)

(58) Field of Classification Search
CPC .................................................. B60H 1/00285
USPC ............... 454/120; 297/180.1, 180.11, 284.2, 297/452.42, 452.43
See application file for complete search history.

(56) References Cited

U.S. PATENT DOCUMENTS

| | | |
|---|---|---|
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 2,022,959 A | 12/1935 | Gordon |
| 2,158,801 A | 5/1939 | Petterson |
| 2,336,089 A | 12/1943 | Gould |
| 2,544,506 A | 3/1951 | Kronhaus |
| 2,703,134 A | 3/1955 | Mossor |
| 2,758,532 A | 8/1956 | Awe |
| 2,782,834 A | 2/1957 | Vigo |
| 2,791,956 A | 5/1957 | Guest |
| 2,912,832 A | 11/1959 | Clark |
| 2,931,286 A | 4/1960 | Fry, Sr. et al. |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kotteman |
| 3,101,037 A | 8/1963 | Taylor |
| 3,101,660 A | 8/1963 | Taylor |

(Continued)

FOREIGN PATENT DOCUMENTS

| | | |
|---|---|---|
| CA | 2599057 A1 | 11/2006 |
| CN | 1856417 A | 9/2005 |

(Continued)

OTHER PUBLICATIONS

Automotive Heat Seats—Heated Steering Wheels, IGB Automotive Ltd., received by Assignee W.E.T. Automotive Systems, May 2003.

(Continued)

*Primary Examiner* — Steven B McAllister
*Assistant Examiner* — Frances F Hamilton
(74) *Attorney, Agent, or Firm* — The Dobrusin Law Firm, P.C.

(57) ABSTRACT

This invention relates to a ventilation means, particularly for ventilating surfaces close to or in contact with persons, having at least one air-ducting means which comprises at least a barrier layer, a covering layer and, therebetween, a distribution layer, at least one barrier layer being arranged on a side of said distribution layer facing away from the user, and at least one covering layer being arranged on a side of said distribution layer facing toward a person.

15 Claims, 1 Drawing Sheet

(56) References Cited

U.S. PATENT DOCUMENTS

Figure 1:
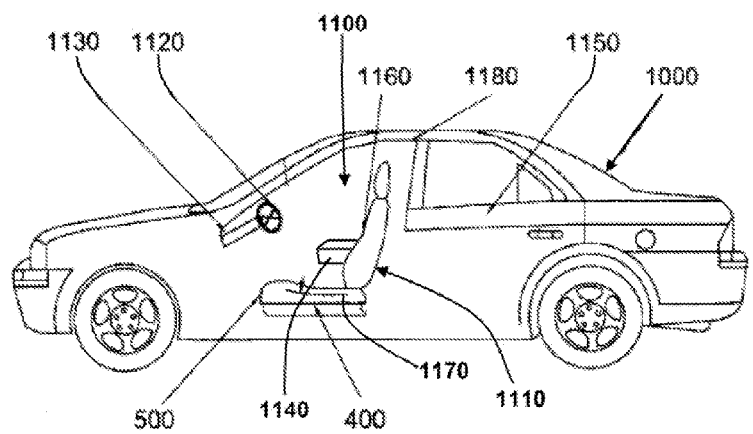

| Patent No. | | Date | Inventor | |
|---|---|---|---|---|
| 3,127,931 A | | 4/1964 | Johnson | |
| 3,131,967 A | | 5/1964 | Spaulding | |
| 3,136,577 A | | 6/1964 | Richard | |
| 3,137,523 A | | 6/1964 | Karner | |
| 3,162,489 A | | 12/1964 | Trotman | |
| 3,209,380 A | | 10/1965 | Watsky | |
| 3,486,177 A | | 12/1969 | Marshack | |
| 3,529,310 A | | 9/1970 | Olmo | |
| 3,550,523 A | | 12/1970 | Segal | |
| 3,552,133 A | | 1/1971 | Lukomsky | |
| 3,628,829 A | | 12/1971 | Hellig | |
| 3,653,589 A | | 4/1972 | McGrath | |
| 3,653,590 A | | 4/1972 | Elsea | |
| 3,681,797 A | | 8/1972 | Messner | |
| 3,684,170 A | | 8/1972 | Roof | |
| 3,732,944 A | | 5/1973 | Kendall | |
| 3,736,022 A | | 5/1973 | Radke | |
| 3,738,702 A | | 6/1973 | Jacobs | |
| 3,757,366 A | | 9/1973 | Sacher | |
| 3,770,318 A | | 11/1973 | Fenton | |
| 3,778,851 A | | 12/1973 | Howorth | |
| 3,948,246 A | | 4/1976 | Jenkins | |
| 4,002,108 A | | 1/1977 | Drori | |
| 4,043,544 A | | 8/1977 | Ismer | |
| 4,060,276 A | | 11/1977 | Lindsay | |
| 4,072,344 A | * | 2/1978 | Li | 297/180.1 |
| 4,141,585 A | | 2/1979 | Blackman | |
| 4,175,297 A | | 11/1979 | Robbins et al. | |
| 4,259,896 A | | 4/1981 | Hayashi et al. | |
| 4,311,273 A | * | 1/1982 | Marsh | 238/1 |
| 4,391,009 A | | 7/1983 | Schild et al. | |
| 4,413,857 A | | 11/1983 | Hayashi | |
| 4,509,792 A | | 4/1985 | Wang | |
| 4,547,920 A | * | 10/1985 | Hulsebusch et al. | 297/256 |
| 4,572,430 A | | 2/1986 | Takagi et al. | |
| 4,589,656 A | | 5/1986 | Baldwin | |
| 4,665,707 A | | 5/1987 | Hamilton | |
| 4,685,727 A | | 8/1987 | Cremer et al. | |
| 4,712,832 A | | 12/1987 | Antolini et al. | |
| 4,729,598 A | | 3/1988 | Hess | |
| 4,777,802 A | | 10/1988 | Feher | |
| 4,847,933 A | | 7/1989 | Bedford | |
| 4,853,992 A | | 8/1989 | Yu | |
| 4,866,800 A | | 9/1989 | Bedford | |
| 4,905,475 A | | 3/1990 | Tuomi | |
| 4,923,248 A | | 5/1990 | Feher | |
| 4,997,230 A | | 3/1991 | Spitalnick | |
| 5,002,336 A | | 3/1991 | Feher | |
| 5,016,302 A | | 5/1991 | Yu | |
| 5,076,643 A | | 12/1991 | Colasanti et al. | |
| 5,102,189 A | | 4/1992 | Saito et al. | |
| 5,106,161 A | | 4/1992 | Meiller | |
| 5,117,638 A | | 6/1992 | Feher | |
| 5,138,851 A | | 8/1992 | Mardikian | |
| 5,160,517 A | | 11/1992 | Hicks et al. | |
| 5,187,943 A | | 2/1993 | Taniguchi et al. | |
| 5,211,697 A | | 5/1993 | Kienlein et al. | |
| 5,226,188 A | | 7/1993 | Liou | |
| 5,292,577 A | | 3/1994 | Van Kerrebrouck et al. | |
| 5,335,381 A | | 8/1994 | Chang | |
| 5,354,117 A | | 10/1994 | Danielson et al. | |
| 5,356,205 A | | 10/1994 | Calvert et al. | |
| 5,370,439 A | | 12/1994 | Lowe et al. | |
| 5,372,402 A | | 12/1994 | Kuo | |
| 5,382,075 A | | 1/1995 | Shih | |
| 5,385,382 A | | 1/1995 | Single, II et al. | |
| 5,403,065 A | | 4/1995 | Callerio | |
| 5,411,318 A | | 5/1995 | Law | |
| 5,416,935 A | | 5/1995 | Nieh | |
| 5,450,894 A | | 9/1995 | Inoue et al. | |
| 5,516,189 A | | 5/1996 | Ligeras | |
| 5,524,439 A | | 6/1996 | Gallup et al. | |
| 5,597,200 A | | 1/1997 | Gregory et al. | |
| 5,626,386 A | | 5/1997 | Lush | |
| 5,639,145 A | | 6/1997 | Alderman | |
| 5,701,621 A | | 12/1997 | Landi et al. | |
| 5,833,321 A | | 11/1998 | Kim et al. | |
| 5,902,014 A | | 5/1999 | Dinkel et al. | |
| 5,918,930 A | | 7/1999 | Kawai et al. | |
| 5,921,858 A | | 7/1999 | Kawai et al. | |
| 5,927,817 A | | 7/1999 | Ekman et al. | |
| 5,934,748 A | * | 8/1999 | Faust et al. | 297/180.12 |
| 6,003,950 A | | 12/1999 | Larsson | |
| 6,019,420 A | * | 2/2000 | Faust et al. | 297/180.14 |
| 6,062,641 A | | 5/2000 | Suzuki et al. | |
| 6,064,037 A | | 5/2000 | Weiss et al. | |
| 6,068,332 A | * | 5/2000 | Faust et al. | 297/180.13 |
| 6,085,369 A | | 7/2000 | Feher | |
| 6,109,688 A | | 8/2000 | Wurz et al. | |
| 6,145,925 A | | 11/2000 | Eksin et al. | |
| 6,179,706 B1 | | 1/2001 | Yoshinori et al. | |
| 6,189,966 B1 | * | 2/2001 | Faust et al. | 297/180.14 |
| 6,196,627 B1 | | 3/2001 | Faust et al. | |
| 6,224,150 B1 | | 5/2001 | Eksin et al. | |
| 6,263,530 B1 | | 7/2001 | Feher | |
| 6,273,810 B1 | | 8/2001 | Rhodes et al. | |
| 6,277,023 B1 | | 8/2001 | Schwartz | |
| 6,291,803 B1 | | 9/2001 | Fourrey | |
| 6,425,637 B1 | | 7/2002 | Peterson | |
| 6,434,328 B2 | | 8/2002 | Rutherford | |
| 6,481,801 B1 | | 11/2002 | Schmale | |
| 6,511,125 B1 | | 1/2003 | Gendron | |
| RE38,128 E | | 6/2003 | Gallup et al. | |
| 6,626,488 B2 | | 9/2003 | Pfahler | |
| 6,629,724 B2 | | 10/2003 | Ekern et al. | |
| 6,629,725 B1 | | 10/2003 | Kunkel et al. | |
| 6,644,070 B2 | * | 11/2003 | Ikenaga et al. | 66/196 |
| 6,676,207 B2 | | 1/2004 | Rauh et al. | |
| 6,682,140 B2 | | 1/2004 | Minuth et al. | |
| 6,687,937 B2 | | 2/2004 | Harker | |
| 6,767,621 B2 | | 7/2004 | Flick et al. | |
| 6,808,230 B2 | | 10/2004 | Buss et al. | |
| 6,817,675 B2 | | 11/2004 | Buss et al. | |
| 6,848,742 B1 | | 2/2005 | Aoki et al. | |
| 6,857,697 B2 | | 2/2005 | Brennan et al. | |
| 6,869,139 B2 | | 3/2005 | Brennan et al. | |
| 6,869,140 B2 | | 3/2005 | White et al. | |
| 6,886,352 B2 | | 5/2005 | Yoshinori et al. | |
| 6,893,086 B2 | * | 5/2005 | Bajic et al. | 297/180.14 |
| 6,976,734 B2 | | 12/2005 | Stoewe | |
| 7,013,653 B2 | | 3/2006 | Kamiya et al. | |
| 7,040,710 B2 | | 5/2006 | White et al. | |
| 7,052,091 B2 | * | 5/2006 | Bajic et al. | 297/452.43 |
| 7,070,232 B2 | | 7/2006 | Minegishi et al. | |
| 7,083,227 B2 | * | 8/2006 | Brennan et al. | 297/180.14 |
| 7,114,771 B2 | | 10/2006 | Lofy et al. | |
| 7,131,689 B2 | | 11/2006 | Brennan et al. | |
| 7,147,279 B2 | | 12/2006 | Bevan et al. | |
| 7,168,758 B2 | | 1/2007 | Bevan et al. | |
| 7,197,801 B2 | * | 4/2007 | Bajic et al. | 29/91.1 |
| 7,275,793 B2 | * | 10/2007 | Fujita et al. | 297/452.56 |
| 7,306,283 B2 | | 12/2007 | Howick et al. | |
| 7,338,117 B2 | | 3/2008 | Iqbal et al. | |
| 7,356,912 B2 | | 4/2008 | Iqbal et al. | |
| 7,370,911 B2 | | 5/2008 | Bajic et al. | |
| 7,510,239 B2 | * | 3/2009 | Stowe | 297/180.12 |
| 7,618,089 B2 | * | 11/2009 | Stoewe et al. | 297/180.13 |
| 7,637,573 B2 | * | 12/2009 | Bajic et al. | 297/452.43 |
| 7,695,062 B2 | * | 4/2010 | Stowe | 297/180.1 |
| 7,838,104 B2 | * | 11/2010 | Chen et al. | 428/292.4 |
| 2004/0195870 A1 | | 10/2004 | Bohlender et al. | |
| 2005/0066505 A1 | | 3/2005 | Iqbal et al. | |
| 2005/0067862 A1 | | 3/2005 | Iqbal et al. | |
| 2005/0093347 A1 | | 5/2005 | Bajic et al. | |
| 2005/0121965 A1 | * | 6/2005 | Stowe | 297/452.42 |
| 2005/0140189 A1 | | 6/2005 | Bajic et al. | |
| 2005/0173950 A1 | | 8/2005 | Bajic et al. | |
| 2005/0200179 A1 | | 9/2005 | Bevan et al. | |
| 2005/0238842 A1 | * | 10/2005 | Schindzielorz et al. | 428/86 |
| 2005/0257541 A1 | | 11/2005 | Kadle et al. | |
| 2006/0138810 A1 | | 6/2006 | Knoll et al. | |
| 2006/0151455 A1 | * | 7/2006 | Stowe | 219/202 |
| 2006/0152044 A1 | | 7/2006 | Bajic et al. | |
| 2006/0158011 A1 | * | 7/2006 | Marlovits et al. | 297/180.1 |

(56) References Cited

U.S. PATENT DOCUMENTS

| | | | |
|---|---|---|---|
| 2006/0225952 A1* | 10/2006 | Takayasu et al. | 181/294 |
| 2007/0001507 A1 | 1/2007 | Brennan et al. | |
| 2007/0176471 A1 | 8/2007 | Knoll | |
| 2007/0246975 A1* | 10/2007 | Bier et al. | 297/180.1 |
| 2008/0160900 A1* | 7/2008 | Iqbal et al. | 454/229 |
| 2008/0246325 A1* | 10/2008 | Pfahler et al. | 297/452.42 |
| 2009/0134675 A1* | 5/2009 | Pfahler | 297/180.1 |
| 2009/0202852 A1* | 8/2009 | Chen | 428/523 |
| 2009/0302646 A1* | 12/2009 | Baur et al. | 297/180.1 |
| 2010/0120315 A1* | 5/2010 | Imashiro et al. | 442/351 |

FOREIGN PATENT DOCUMENTS

| | | |
|---|---|---|
| DE | 37 05 756 | 10/1988 |
| DE | 41 12 631 | 4/1992 |
| DE | 19503291 | 8/1996 |
| DE | 19654370 | 3/1998 |
| DE | 197 37 636 | 3/1999 |
| DE | 19805174 | 6/1999 |
| DE | 198 10 936 | 9/1999 |
| DE | 199 54 978 | 1/2001 |
| DE | 100 01 314 | 7/2001 |
| DE | 100 24 880 | 9/2001 |
| DE | 10013492 | 9/2001 |
| DE | 201 11 640 U1 | 10/2001 |
| DE | 10030708 | 1/2002 |
| DE | 10144839 | 3/2003 |
| DE | 13046342 A1 | 4/2004 |
| DE | 10261902 | 8/2004 |
| DE | 10316732 | 10/2004 |
| DE | 10326446 | 10/2004 |
| DE | 10326446 A1 * 10/2004 | B60N 2/5635 |
| DE | 10338525 | 3/2005 |
| DE | 10346064 | 4/2005 |
| DE | 102004052076 A1 | 5/2006 |
| DE | 102005006060 A1 | 8/2006 |
| DE | 102006017103 | 10/2007 |
| DE | 112006000384 T5 | 1/2008 |
| EP | 0 280 213 | 8/1988 |
| EP | 411375 | 5/1994 |
| EP | 0809576 | 5/1999 |
| EP | 0 936 105 | 8/1999 |
| EP | 0 730 720 | 7/2000 |
| EP | 1088696 | 9/2000 |
| EP | 1050429 | 11/2000 |
| EP | 1123834 | 2/2001 |
| EP | 1266794 | 12/2002 |
| EP | 1323573 | 7/2003 |
| EP | 1349746 | 8/2005 |
| FR | 1266925 | 9/1960 |
| FR | 2599683 | 6/1986 |
| FR | 2630056 | 10/1989 |
| FR | 2694527 A1 | 2/1994 |
| FR | 2845318 | 4/2004 |
| JP | 1171509 | 7/1989 |
| JP | 5277020 | 10/1993 |
| JP | 8285423 | 11/1996 |
| JP | 10044756 | 2/1998 |
| JP | 2000125990 | 2/2000 |
| JP | 2000333782 | 12/2000 |
| JP | 2001071800 | 3/2001 |
| JP | 2002125801 | 5/2002 |
| JP | 2002225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 202556 | 3/1966 |
| WO | 91/12150 | 8/1991 |
| WO | 94/09684 A1 | 5/1994 |
| WO | 96/05475 | 2/1996 |
| WO | 97/09908 | 3/1997 |
| WO | 99/00268 | 1/1999 |
| WO | 02/06914 A1 | 1/2002 |
| WO | 02/053410 | 7/2002 |
| WO | 03/051666 | 6/2003 |
| WO | 03/077710 | 9/2003 |
| WO | 03/101777 | 12/2003 |
| WO | 03/106215 | 12/2003 |
| WO | 2004/082989 | 3/2004 |
| WO | 2004/028857 | 4/2004 |
| WO | 2004/078517 | 9/2004 |
| WO | 2004/082969 | 9/2004 |
| WO | 2004/091966 | 10/2004 |
| WO | 2004/091967 | 10/2004 |
| WO | 2004/096601 | 11/2004 |
| WO | 2004/096602 | 11/2004 |
| WO | 2005/021320 | 3/2005 |
| WO | 2005/035305 | 4/2005 |
| WO | 2005/042301 | 5/2005 |
| WO | 2005/047056 | 5/2005 |
| WO | 2005/068253 | 7/2005 |
| WO | 2005065987 A2 | 7/2005 |
| WO | 2005087880 A1 | 9/2005 |
| WO | 2005/110806 | 11/2005 |
| WO | 2006/117690 A2 | 9/2006 |

OTHER PUBLICATIONS

Automotive Seat Heating Systems, Bauerhin International, received by Assignee W.E.T. Automotive Systems, May 2002.
Excerpt from website http://www.icar.com/html_pages / about_icar/current_events_news/advantage1-Car Advantage Online.
Excerpt from website http://www.seatcomfort.com/ semashow1.htm, Specializing in Seat Ventilation and Heating Systems, Seat Comfort Systems Unveils 3 New Seat Heater Products.
Excerpt from website http://seatcomfort.com/ventilation.htm, Specializing in Heat Ventilation and Heat Systems, Ventilation.
GMT 830 Heating & Ventilation System, IGB Automotive Ltd., received by Assignee W.E.T. Automotive Systems, Jun. 2003.
Komfortabel bei jeder Temperatur.
Seat Heating Systems, Kongsherg Automotive, believed to be from websitehttp://www.kongsberg-automotive.no/.
Lexus LS430 Conditioned Seat, Pictures of prior products.
Cadillac XLR Conditioned Seat, Pictures or prior products.
English Translation of Office Action received in corresponding CN200910163981.0.
English Translation of Office Action received in corresponding JP App. No. 2009-088983 (Pub. No. JP20090088983 Apr. 1, 2009).
English Translation of Office Action received in corresponding KR 1020090019225.
German Office Action received in corresponding DE 102008017965. 5-16.
German Opposition for Application No. 102008017965.5 dated Jan. 25, 2012.
Kunststoff-Tabelle, Christen/Vogtle: Grudlagen der organischen Chemie, 2. Aufl. 1998, S. 782ff. http://www.chemie.fu-berlin.de/chemistry/kunststoffeltabelle.htm dated Jan. 25, 2012.
www.pagodentreff.de/diskussionsforum/t141-perforation-sitze.html Jan. 25, 2012.
Auszug aus Wikipedia—Gore-Tex, http://de.wikipedia.org/Gore-Tex Jan. 25, 2012.

* cited by examiner

Figures 2, 3:
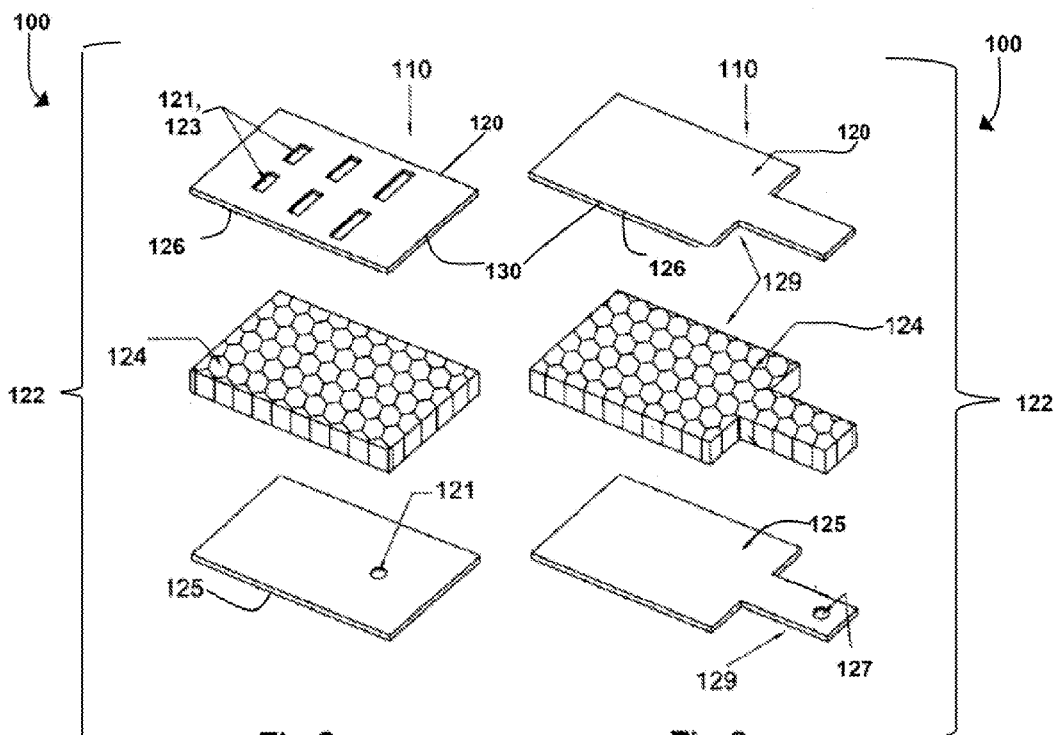

VENTILATION MEANS
>
> ## CLAIM OF PRIORITY
>
> The present application claims the benefit of the priority of the filing date of the German application, DE 10 2008 017 965.5 filed 8 Apr. 2008, which is herein incorporated by reference for all purposes.
>
> ## FIELD OF THE INVENTION
>
> The present invention relates to ventilation means particularly for ventilating surfaces close to or in contact with persons, having at least one air-ducting means which comprises at least a barrier layer, a covering layer and, therebetween, a distribution layer, at least one barrier layer being arranged on a side of said distribution layer facing away from the user, and at least one covering layer being arranged on a side of said distribution layer facing toward a person.
>
> ## BACKGROUND OF THE INVENTION
>
> The subject matter of this invention includes a ventilation means according to the preamble of claim 1.
>
> Seat ventilation means in which air is blown through a seat cover by means of a ventilator are known.
>
> It is desirable to develop improved or alternative technical solutions that offer advantages particularly in respect of their production costs, their ability to create a pleasant climate and/or their energy consumption.
>
> ## SUMMARY OF THE INVENTION
>
> Against this background, a technical idea incorporating the features of claim 1 is proposed. Further advantageous embodiments are evident from the other claims and the following description.
>
> From a number of conceivable solutions, such as moisture-absorbing materials, a permanently operating ventilator, replacement of conducting layers by fans directly beneath the surface of the cover, etc., a solution has been found here with which, surprisingly, the difference in air and vapor permeability shown by the materials used suffices to create a significant climate improvement even when the fan is switched off.
>
> The ventilation means according to the invention permits efficient ventilation while the fan is running. At the same time, it prevents moisture from collecting on a surface to be ventilated and/or on the skin of a user when the fan is not running.
>
> Accordingly, pursuant to a first aspect of the present invention, there is contemplated a Ventilation means, particularly for ventilating surfaces close to or in contact with persons, having at least one air-ducting means which comprises at least a barrier layer, a covering layer and, therebetween, a distribution layer, at least one barrier layer being arranged on a side of said distribution layer facing away from the user, and at least one covering layer being arranged on a side of said distribution layer facing toward a person, characterized in that at least one covering layer is at least partially air-permeable and at least partially vapor-permeable, and that the barrier layer is configured at least partially in such manner as to inhibit the passage of air and/or vapor.
>
> The invention of the first aspect may be further characterized by one or any combination of the features described herein, such as the vapor-permeable portion of the covering layer (126) makes up at least 10% of the covering layer's surface area and/or of the surface to be ventilated, preferably at least 30%, more preferably 50%, even more preferably 70%, and most preferably 90%; the covering layer (126) has at least one portion in which the air permeability is less than 50 $l/(dm^2 \times min)$, more preferably 10 $l/(dm^2 \times min)$, and the vapor permeability has an $s_D$ value smaller than 1,500 m, preferably smaller than 10 m, more preferably smaller than 0.5 m; the entire surface area of the vapor-permeable portions of the covering layer (126) is greater than the entire surface area of the air-permeable portions of the covering layer (126), preferably at least 10% greater, more preferably 50%, even more preferably 100%, most preferably 300% or more; the covering layer (126) includes a non-woven fabric, preferably containing polyester microfibers and/or polyamide fibers, preferably in a percentage mixing ratio of 10 to 90:60 to 10; a Seat (1110), characterized in that it has at least one ventilation means (120) according to one any of the above; a vehicle (1000), characterized in that it is equipped with at least one ventilation means (120) and/or at least one seat (1110) according any of the above.
>
> ## DRAWINGS
>
> Details of the invention are explained in the following. These explanations are intended to elucidate the invention. However, they are only of exemplary nature. The scope of the invention naturally allows for one or more of the described features to be omitted, modified or augmented. And it goes without saying that the features of different embodiments can be combined with each other. What is crucial is that the idea behind the invention is essentially implemented. If a feature is to be at least partially fulfilled, this includes complete or substantial fulfillment of the feature. "Essentially" as used here means particularly that implementation permits the desired usefulness to be achieved to a recognizable extent. This can mean, in particular, that a specific feature is fulfilled to an extent of at least 50%, 90%, 95% or 99%.
>
> Reference will be made hereinafter to:
>
> FIG. 1 A vehicle with a ventilation means, partially in longitudinal section
>
> FIG. 2 An exploded view of a first embodiment of a ventilation means
>
> FIG. 3 An exploded view of a second embodiment of a ventilation means
>
> ## DETAILED DESCRIPTION OF THE INVENTION
>
> FIG. 1 shows a vehicle 1000. The vehicle can be, for example, an airplane, a rail vehicle, a ship, or, as here, a motor vehicle.
>
> The vehicle 1000 has at least one interior fitting 1100. The interior fitting 1100 preferably has at least one cover 500 and/or at least one cushion 400. In case of doubt, interior fittings are defined as all those components with which a user of the passenger compartment can come into contact, such as a surface of a vehicle steering device 1120, a surface of a dashboard 1130, a surface of an armrest 1140, a surface of a door-trim panel 1150, a surface of a seat pad 1160, a surface of an electric blanket 1170, a surface of a roof lining 1180 or, as here, a surface of a seat 1110.
>
> The interior fitting 1100 preferably includes at least one climate-conditioning system 100 (FIGS. 2 and 3). This serves, for example, for the temperature control or air conditioning of user-contact surfaces in the passenger compartment of a vehicle. The climate-conditioning system 100 has at least one temperature-control means 110, at least one ventilation means 120 and/or at least one moisture-regulating means 130. The term "temperature-control means" refers to any means that can be used to selectively alter the temperature of its surroundings, e.g. all devices having at least one electrical heating resistor, a flat textile heating element, a heat pump, a Peltier element and/or an air-movement means such as a fan. The term "ventilation means" refers to any means that can be used to selectively alter the air composition or the airflows in a given surface or spatial area by way of air exchange, e.g. an on-board air-conditioning system, at least partially air-permeable spacer media, knitted spacer fabrics and/or an air-conditioning insert. The term "moisture-regulating means" refers to a means for regulating the humidity of its surroundings, especially the temperature-control means already mentioned or moisture-absorbing substances such as activated carbon fibers, or polymeric superabsorbers.

A ventilation means as shown in FIGS. 2 and 3 has one or more air inlets 121, one or more air-ducting means 122 and one or more air outlets 123, 123'.

At least one air-ducting means 122 preferably has one or more distribution layers 124, one or more barrier layers 125 and one or more covering layers 126, 126'.

The term "barrier layer" 125 refers particularly to a layer of which at least a portion inhibits or prevents the passage of air, water and/or water vapor. The term refers particularly to layers with a water vapor transmission resistance of more than 35 $(m^2Pa)/W$.

The $s_D$ value, i.e. the product of the material-specific diffusion resistance coefficient μ and layer thickness d, may also be used here as a measure of diffusion. In this context, especially according to DIN 4108-3, layers are considered to be diffusion permeable if their $s_D$ value is ≤0.5 m, diffusion impermeable if their $s_D$ value is ≥1,500 m and diffusion-inhibiting if their $s_D$ value is between 0.5 m und 1,500 m. At least one barrier layer 125 preferably includes at least one portion in which its vapor permeability or its $s_D$ value is greater than 0.5 m, better 10 m, better 1,000 m, better 1,500 m and more. The $s_D$ value may also be variable, and depend, for example, on the amount of moisture present on the barrier layer 125. In is then to advantage if the $s_D$ value is higher when there is more moisture present.

The barrier layer 125 is preferably only slightly or not at all air-permeable. By that is meant, in particular, an air permeability of less than 100 $l/(dm^2 \times min)$, better 10 $l/(dm^2 \times min)$, better still 5 $l/(dm^2 \times min)$. These values are relative to a test pressure of 100 Pa.

One or more barrier layers 125 are preferably arranged in such manner relative to one or more distribution layers 124 as to shield at least sections of the particular distribution layer 124 from its surroundings. The barrier layer preferably covers the whole of that surface of the distribution layer 124 that faces away from a passenger, and projects a little way beyond it at one or more edges. This prevents air and pressure losses. At least one barrier layer 125 is made at least partially of film or of a layer of plastic, polymer or other material of low permeability, such as metal foils. It may also be made of a foamed, preferably closed-cell material, such as the foam of a seat cushion. The barrier layer 125 is preferably configured as a single layer of homogeneous material.

The barrier layer 125 may have one or more air-passage openings 127 so that, for example, a fan can be connected thereto. These air-passage openings 127 can serve as air inlets 121 into the air-ducting means 122 if a fan connected thereto is required to blow air to the user. They can also serve as air outlets 123 if air is drawn away from the user by a fan.

One or more distribution layers 124 preferably have a spacer means which maintains a space, at least section-wise, between one or more covering layers 126 and at least one barrier layer 125. Suitable spacer means for this purpose include, for example, knitted spacer fabrics and/or adjacently arranged spirals with plastic and/or glass fiber components.

The term "covering layer" 126 refers particularly to a layer that at least partially covers the ventilation means on the user side. It refers especially to a layer of which at least a portion is poorly permeable or impermeable at least to air. The values may be defined in the same way as for the barrier layer.

One or more covering layers 126 are preferably arranged in such manner relative to one or more distribution layers 124 as to shield at least sections of the distribution layer 124 from its surroundings. The covering layer preferably covers the whole of that surface of the distribution layer 124 that faces toward a passenger, and projects a little way beyond it. This prevents air and pressure losses.

At least one covering layer 126 is preferably made at least partially of film or of a layer of plastic, polymer or other material of low air or vapor permeability, such as metal foils. It may also be made of a foamed, closed-cell material, such as the foam of a seat cushion. Alternatively, or in addition, the covering layer may be made at least partially of a material which, at least section-wise, is highly permeable to vapor, water and/or air. The covering layer 126 may be configured as a single layer of homogeneous material, but preferably it comprises two different layers with different permeabilities to air and/or water or vapor.

The covering layer 126 may have one or more air-passage openings 127' so that, for example, a fan can be connected thereto. These air-passage openings 127' can serve as air inlets 121 into the air-ducting means 122 if a fan connected thereto is required to blow air to the user. They can also serve as air outlets 123 if air is drawn away from the user by a fan.

At least one covering layer 126 allows the passage of water vapor and/or water at least partially and/or section-wise. At least one covering layer 126 preferably includes at least portions in which the air permeability is greater than 10 $l/(dm^2 \times min)$, better 50 $l/(dm^2 \times min)$, better at least 100 $l/(dm^2 \times min)$. The covering layer 126 also preferably includes at least one portion in which its vapor permeability or its $s_D$ value is smaller than 1,500 m, better smaller than 10 m, better 1 m, better 0.5 m. By this is meant, in particular, a water vapor transmission resistance of less than 35 $(m^2Pa)/W$. It is to advantage for at least sections, but preferably the entire surface, of at least one covering layer 126 to be vapor-permeable. The breathability or water-vapor transmission resistance $R_{et}$ is preferably ≤35 $(m^2Pa)/W$, preferably ≤20 $(m^2Pa)/W$, preferably ≤5 $(m^2Pa)/W$, preferably ≤3 $(m^2Pa)/W$.

The $s_D$ value may also be variable, and depend, for example, on the amount of moisture present on the covering layer 126. In is then to advantage if the $s_D$ value is higher when there is more moisture present.

As shown in FIG. 2, the air-passage openings 127' may be window-like apertures in the covering layer 126. As shown in FIG. 3, however, they may also be formed by micro-perforations and/or by stitches or gaps between the threads or fibers of a textile.

Examples of suitable textiles include those with a square-meter weight of 133 $g/m^2$ or less. A textile of such kind is preferably a non-woven fabric and/or preferably a textile comprising a plurality of fiber types, for example polyethylene (PET) and polyamide (PA 6). The proportion of PET fibers is preferably greater than that of PA 6 fibers. The proportion of PET fibers is preferably at least 60%, better 70% and more. The proportion of PA 6 fibers is preferably between 15 and 45%. The covering layer 126 is preferably made at least partially of a material that absorbs moisture only slightly or not at all.

The air-ducting means 122 is preferably configured as a modular system in which at least one barrier layer 125, one distribution layer 124 and one covering layer 126 form a connected assembly. This assembly may also be combined with an electric heating element, preferably a flat electric heating element, a fan and/or a heater blower to form a climate-control insertion module. The air-ducting means preferably has only two or three layers, which, for their part, are made of a homogeneous, single-layer material.

The covering layer 126 and the barrier layer 125 preferably project at least partially beyond one or more edges of the distribution layer 124 and are connected there with each other, for example by bonding, welding or sewing. Provisions may be made for this connection not to encompass the entire edge of the air-ducting means 122 but to leave air-passage openings 127 so that air can be blown into the distribution layer 124 and withdrawn therefrom from the side. It is also within the scope of the invention to provide a "snorkel" 129 in this area, as shown in FIG. 3, so that the air-ducting means 122 can be connected at a point spaced away from a surface to be ventilated. This can serve, for example, for drawing in cold air from the floor area of the seat.

It is expedient if the interior of the air-ducting means 122 interconnects with the air surrounding the surface to be ventilated, or the seat 1110, even when the fan is switched off. This enables moisture that diffuses through the covering layer 126 into the interior of the air-ducting means 122 to exit at air-passage openings 127 spaced away from the surface to be ventilated.

LIST OF REFERENCE NUMERALS

100 Climate-conditioning system
110 Temperature-control means
120 Ventilation Means
121 Air inlets
122 Air-ducting means
123, 123' Air outlet
124 Distribution layer
125 Barrier layer
126, 126' Covering layer
127 Air-passage opening
129 "Snorkel"
130 Moisture-regulating means
400 Cushion
500 Cover
1000 Vehicle
1110 Seat
1100 Interior fitting
1120 Vehicle steering device
1130 Dashboard
1140 Armrest
1150 Door-trim panel
1160 Seat pad
1170 Electric blanket
1180 Roof lining

The invention claimed is:
1. A Ventilation means for ventilating surfaces close to or in contact with a user, the ventilation means comprising:
at least one air-ducting means which comprises
1) at least one barrier layer,
2) at least one covering layer including:
i. an air permeable layer including an air permeability between 10 l/(dm²×min) and 100 l/(dm²×min); and
ii. a water permeable layer allowing the passage of water through the water permeable layer and including a vapor permeability of less than 10 m and greater than 0 m according to DIN 4108-3;
3) a distribution layer located between the at least one barrier layer and the at least one covering layer,
wherein the at least one barrier layer is arranged on a side of said distribution layer facing away from the user, the at least one covering layer is arranged on a side of said distribution layer facing toward the user, and the barrier layer and the covering layer project at least partially beyond one or more edges of the distribution layer and are connected together,
wherein the at least one covering layer is at least partially vapor-permeable, and
wherein the at least one barrier layer at least partially inhibits passage of air and/or vapor.

2. The Ventilation means according to claim 1, wherein the covering layer includes a vapor-permeable portion that makes up at least 10% of the covering layer's surface area and/or of the surface to be ventilated.

3. The Ventilation means according claim 1, wherein the covering layer has at least one portion in which the air permeability is less than 50 l/(dm²×min) but greater than 0 l/(dm²×min) and the vapor permeability has an $s_D$ value smaller than 1,500 m but greater than 0 m.

4. The Ventilation means according to claim 2, wherein the vapor-permeable portions of the covering layer include a surface area that is greater than a surface area of the air-permeable portions of the covering layer,
wherein the vapor-permeable portions make up at least 70% of a surface area of the covering layer and/or a surface to be ventilated.

5. The Ventilation means according to claim 1, wherein the covering layer includes a non-woven fabric, comprising at least one of polyester microfibers and polyamide fibers,
wherein a ratio of the at least one of the polyester microfibers and polyamide fibers to the covering layer is 10 to 90:60 to 10.

6. A Seat including at least one ventilation means according to claim 1.

7. A Vehicle including at least one vehicle interior fitting including at least one ventilation means according to claim 1.

8. The Ventilation means according to claim 1, wherein the covering layer is a non-woven fabric that has a square-meter weight of 133 g/m² or less but greater than 0 g/m² and comprises two different layers with different permeabilities to air and/or water or vapor.

9. The Ventilation means according to claim 1, wherein the ventilation means ventilates an arm rest surface, a door-trim panel surface, or a steering device surface.

10. The Ventilation means according to claim 8, wherein the ventilation means includes a fan.

11. The Ventilation means according to claim 10, wherein the covering layer includes one or more air passage openings so that the fan is connected thereto.

12. The Ventilation means according to claim 10, wherein the at least one air-ducting means includes a snorkel so that the air-ducting means is connected at a point that is spaced away from the surface to be ventilated.

13. The Ventilation means according to claim 10, wherein the one car more edges are connected by bonding, welding, or sewing.

14. A climate-conditioning system that includes at least one temperature-control means, the at least one ventilation means of claim 8, and at least one moisture-regulating means.

15. The Ventilation means of claim 10, wherein the air distribution layer includes a spacer means which maintains a space between the covering layer and the barrier layer.

* * * * *